United States Patent
Op De Beek et al.

(10) Patent No.: US 6,366,635 B1
(45) Date of Patent: Apr. 2, 2002

(54) METHOD AND APPARATUS FOR THREE-DIMENSIONAL IMAGE-RENDERING OF A SPATIAL AND TISSUE-BASED CONFIGURATION THROUGH SEPARATING HIGH CONTRAST AND INJECTED CONTRAST AGENTS IN MULTI-ANGULAR X-RAY ABSORPTION MEASUREMENT

(75) Inventors: Johannes Catherina Antonius Op De Beek, Eindhoven (NL); Geert Richard Kemkers, Fairfield, CT (US); Jozephus Wilhelmus Maria Van Der Heijden, Deurne (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/587,398

(22) Filed: Jun. 5, 2000

(30) Foreign Application Priority Data

Jun. 4, 1999 (EP) .............................................. 99201772

(51) Int. Cl.$^7$ ................................................. H61B 6/03
(52) U.S. Cl. ................................................. 378/4; 378/8
(58) Field of Search ............................... 378/4, 8, 98.11

(56) References Cited

U.S. PATENT DOCUMENTS

| | | | |
|---|---|---|---|
| 5,682,413 A | 10/1997 | Wong et al. ............. | 378/98.11 |
| 5,690,106 A | * 11/1997 | Bani-Hashemi et al. . | 128/653.1 |
| 5,832,134 A | * 11/1998 | Avinash et al. ............. | 382/257 |
| 5,852,646 A | 12/1998 | Klotz et al. ..................... | 378/8 |

FOREIGN PATENT DOCUMENTS

DE 19620371 A1 * 4/1996 ............ A61B/6/03

OTHER PUBLICATIONS

"Practical cone–beam algorithm" by I.A. Feldkamp, L.C. Davis, and J.W. Krees, in J. Optical Society of America, vol., 1, No. 6, Jun. 1984, pp. 612–619.

"3D rotational angiography: Clinical value in endovascular treatment" by J. Moret, R. Kemkers, J. Op de Beek, R. Koppe, E. Klotz and M. Grass in Medicamundi, vol. No. 42, Issue 3, Nov., 1998, pp. 8–14.

Car '98 Computer Assisted Radiology and Surgery, Proceedings of the 12 International Symposium and Exhibition, Tokyo, Jun. 24–27, 1998 by Heinz U. Lemke, PhD, Kiyonari Inamura, PHd, Michael W. Vannier, MD, Allan G. Farman, pp. 182–187.

* cited by examiner

*Primary Examiner*—Robert H. Kim
*Assistant Examiner*—Irakli Kiknadze

(57) ABSTRACT

A three-dimensional image of a spatial and tissue-based configuration is rendered through multi-angular absorption measurements of rayed radiation when traversing the configuration for a mask run and a contrast run respectively, while in a manipulating operation causing at least partial discrimination of certain high-absorptive items in the configuration. In particular, in each of the mask run and the said contrast run the image is calculated. The manipulating operation is executed after the calculating. Finally, voxel rendering thresholds are assigned.

5 Claims, 2 Drawing Sheets

METHOD AND APPARATUS FOR THREE-DIMENSIONAL IMAGE-RENDERING OF A SPATIAL AND TISSUE-BASED CONFIGURATION THROUGH SEPARATING HIGH CONTRAST AND INJECTED CONTRAST AGENTS IN MULTI-ANGULAR X-RAY ABSORPTION MEASUREMENT

A method and apparatus for three-dimensional image-rendering of a spatial and tissue-based configuration through separating high contrast and injected contrast agents in multi-angular X-ray absorption measurement.

BACKGROUND OF THE INVENTION

The invention relates to a system as recited in the preamble of Claim 1. The method applies to a tissue-based configuration, which tissue actually represents or originates from living matter. Usually, although not restrictively, the various angles stem from a rotational motion only of the direction of radiating. Known volume reconstruction in 3D-RX has for some time used the algorithm as first published in L. A. Feldkamp et al, Practical Cone Beam Algorithms, J. Opt. Soc. Am. A6 (1984) pp. 612–619. Certain results of the procedure have been published in J. Moret et al, 3D rotational angiography: Clinical value in endovascular treatment, Medica Mundi Vol. 43, Issue 3 (November 1998), pp. 8–14, and in R. Kemkers et al, 3D-Rotational Angiography: First clinical application with use of a standard Philips C-arm system, Proc. CAR '98, pp. 182–187. In these two publications, a high spatial resolution combines with large contrast differences as distinguished from Computer Tomography. The high-pass filtering used causes a good discrimination of high contrast objects, thereby allowing the use of non-subtracted rotational images. Reconstructed images show good visibility of items such as arteries and aneurysms that are filled with a contrast-enhancing substance. Through volume-rendering techniques, visualization can assign the available grey-levels to calculated high-contrast structures in an optimum manner. The method may find application in various branches of medicine, such as neural surgery and osteopathology.

However, the existing presence, or the interventional providing of externally provided objects for remedial and other purposes, such as platinum coils, clips, and stents (hereinafter "objects"), will introduce volumes of a much higher contrast-density than the highest density associated to contrast fillings. This means a reduced selectivity when visualizing the latter items, sometimes to the effect of sub-standard definition of the transitions between interventional contrast fillings and the above discrete objects. Another curative intervention in the tissue can be the introducing of a self-fixating glue for filling aneurysms and arterio-vascular malformations or AVMs. Here, the introduced matter would not impede the voluminal rendering, but rather could the assessing of an adequate filling or otherwise of the intended vessel with glue become more or less invisible in the process of visualization.

Conventional rotational angiography has been equipped with a subtraction feature between two successive runs: one run a mask image without contrast, and the other run a contrast image, both of them being 2D-images. Visualizing has been effected through on-the-fly subtracting of the two runs, to immediately produce the introduced contrast difference for the projection run. This immediate subtracting may however obscure many pre-existent feature structures such as bone and "old" objects. By itself, accurate subtraction proved attainable through a newly attained high degree of spatial reproducibility and temporal stability of the apparatus. This has obviated the need for repeated calibration that need no longer be executed after a small number of images already. Finally, the immediate subtraction of the two runs of data means that the "background" image is no longer in use.

The inventors have recognized that the immediate subtraction of the two images has various disadvantages, and have recognized the feasibility of reversing the sequence of operations in that first a 3D image would be calculated, which image is subsequently compensated for unwanted features that thereupon will be excluded from the rendering process. The amended procedure has proven to allow more and easier manipulating of images with respect to size and scale, viewing angle, discrimination between various elements featured in a configuration, such as the elements of the tissue, the glue, and implant objects. Moreover, the subtraction of the 3D images to a certain extent smears out small errors that may be due to spatial discrepancies.

From this moment on, various possibilities are open: A first feature is that a 3D image may be based on the high contrast matter or HCM only without complicating vessel structures, such as for assessing correct object manipulation.

In the second place, the high-contrast material or HCM voxels may get a low greyness value, so that only the vessels get rendered in a region of interest with widely varying greyness values.

The two preceding results may be combined through temporally non-uniform procedures, such as by blinking, alternating, or by rendering in specific colours and/or greyness profiles.

The HCM voxels may be presented as a separate surface-rendered and colored volume.

SUMMARY TO THE INVENTION

In consequence, amongst other things, it is an object of the present invention to provide an improved imaging technology through separating the HCM image from the low absorption image for allowing improved manipulation of various parts of the image. Furthermore, the rendering may allow to include both transient and also temporally steady features. Now therefore, according to one of its aspects the invention is characterized according to the characterizing part of Claim 1.

Additional advantages of the present invention would be as follows. In using the prior art immediate subtraction, each pixel area enters the subtracting operation separately. Thereby, even a small shift between a mask image and the corresponding contrast image can cause spatial inaccuracies in transitions, both between respective arteries and the like, and also between HCM and non-HCM elements. In particular, bone structures can get enhanced and cause perturbance. The improved procedure of the present invention may now cause such inaccuracies exclusively in HCM-based transitions. The volume-determination would spread out certain inaccuracies in space, as it were.

Furthermore, due to variations in the image intensification factor, such as under influence of a non-steady high voltage of the radiation detection chain, and due to the absence of a reference image on the basis of a single contrast image, the image information according to the present invention may be non-linear and less than ideal. In the final subtracted image, this may sometimes cause non-linear errors, such as beam-hardening, saturation, etcetera, in places where HCM-object contrast and tissue-based contrast will overlap.

Through the used high-pass reconstruction filter, this may cause further objects in the 3D reconstructed volume. However, in contrast with prior art, the novel procedure of subtracting after generating the 3D image, will not further amplify these adverse effects. The presence of HCM may justify applying the new method, in view of the increased X-Ray dose for the patient that is caused by the second run. In practice, the second run proves to provide a richer image content, as compared to the usage of only a single run. Note that the manipulating of the image as used herein is understood to mean the influencing of the image representation, without the apparatus knowing what the various pixels effectively mean.

The invention also relates to an apparatus being arranged for executing a method as claimed in Claim 1. Further advantageous aspects of the invention are recited in dependent Claims.

BRIEF DESCRIPTION OF THE DRAWING

These and further aspects and advantages of the invention will be discussed more in detail hereinafter with reference to the disclosure of preferred embodiments, and in particular with reference to the appended Figures that show.

DETAILED DESCRIPTION OF PREFERRED EMBODIMENTS

The procedures presented herein are valid and useful if the original projection images contain contrast differences as overlapping aspects, so that these features cannot be discriminated or separated. According to the present invention, such information that is overlapping in a particular direction, such as in a plane, will be separated through reconstructing for imaging in a spatial configuration that has an additional dimension. Subtracting on the basis of identifiable voxels or otherwise manipulating in such higher-dimensional space will care for separation and recognizability. Furthermore, the separating allows for repairing the reconstructed image, as it were.

In addition to subtraction through mask volume image and contrast volume image respectively, the existence of sufficient contrast difference also allows for a single volume image the segmenting of objects that have a high contrast difference on the voxel level. In the original 2D images, such was impossible due to overlap in the pixels of the projection. The invention can allow the segmenting while going from 2D X-Ray images to 3D volume images; objects such as coils, clips, stents, and similar objects may be effectively segmented.

Figure 1:
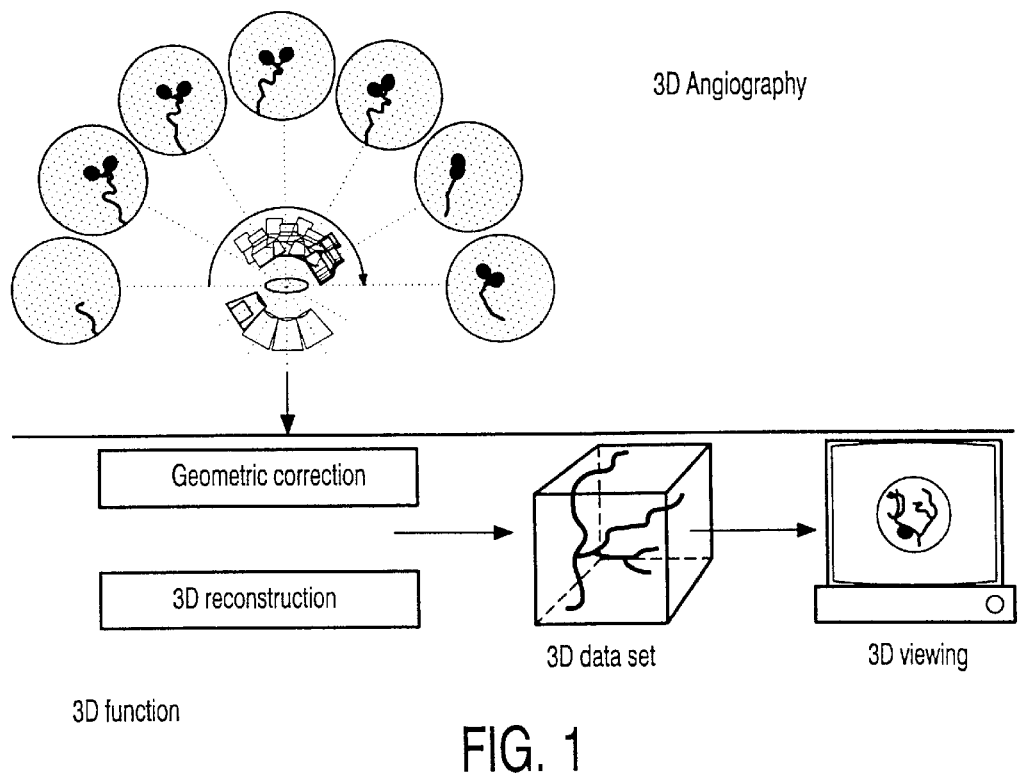
FIG. 1, a schematic set-up of 3D angiography.

FIG. 1 shows a schematic set-up of 3D angiography, as derived from a paper by J. Moret et al, 3D Rotational Angiography, Medica Mundi, Vol.42, Issue 3, pp.8–14, November 1998. In the Figure, the central tissue is subjected at several rotational angles to an X-ray absorption measurement; in principle, 3D-rotation of these directions can be feasible. In practice, the number of measurements would run to about 100. For simplicity, the supportive construction has not been shown. The absorption pattern is picked up by a state-of-the-art pickup mechanism, corrected as far as feasible and necessary for various distortions such as non-linear response of the detection mechanism and pincushion distortion. The set of absorption patterns is processed to produce a pair of 3D data set reconstructions, one for the high contrast objects only, and one for the overall configuration.

For better instruction, the referenced paper includes 3D visualizations of coils, a stent, and various arterial deformations such as aneurysms and AVMs. Herein, coils are often thin platinum wires that will curl up in appropriate windings when introduced into curved blood vessels and blood-filled cavities. Stents are highly flexible and extendible tube-like structures made of wire mesh that can extend and shorten under appropriate forces. Clips are resilient mechanisms that comprise a spring action and which may have a clasping effect on certain vessels for impeding throughput of body fluid. Furthermore, it has become practice to introduce so-called glues into body vessels. The glue will move under the influence of gravity into desired locations and will solidify as a natural process. Although having somewhat higher absorption than standard tissues, the glue has appreciably less absorption than the other tools that are usually made of metals or metal alloys. This necessitates special care for correct rendering of the glue volume elements.

Finally, the 3D visualizations of the HCM objects and of the overall configuration are combined in one of various manners through manipulating and subsequently used for a combined 3D visualization that in its turn is used for 3D viewing under one or more appropriate viewing angles, spatial magnification, and if necessary, further manipulated through amending coloring, intensity and/or representation mode of the various voxels.

Figure 2:
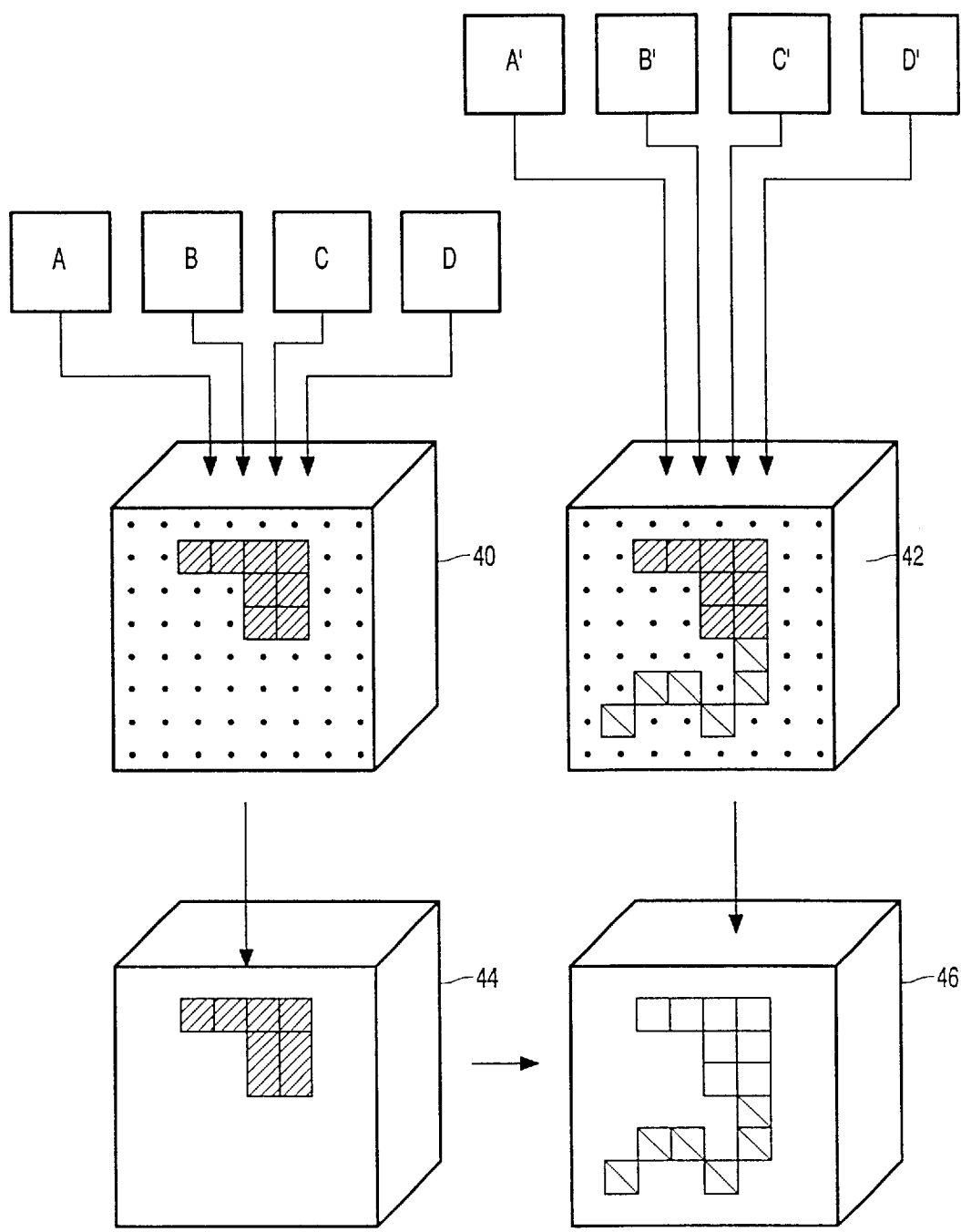
FIG. 2, an image-based diagram of successive operations of the present invention, FIG. 3, a system-based diagram of successive operations of the present invention.

FIG. 2 is an image-based diagram of successive operations of the present invention. The calibration is understood to have been executed beforehand. Now first, a run of mask images A through D are taken up under various angles such as shown in FIG. 1. Next, a run of contrast images A' through D' are taken up under various angles as well, after the contrast medium has been introduced in the tissue vessels in an appropriate manner. The temporal distance between the two runs is relatively short, such as 30 seconds, thereby avoiding movement of the configuration. Next, the three-dimensional images of the two runs are calculated, and represented here as cubes with the content of certain voxels depicted. The mask run yields image 40 that contains HCM voxels shown as heavily shaded squares, and further voxels that have a symbolic dot. Likewise, the contrast run yields image 42 that has HCM voxels shown as heavily shaded squares, contrast-filled voxels that have been shown as lightly shaded voxels, and further voxels that again have a symbolic dot. Next, the mask image is thresholded to yield image 44 that has only object voxels and empty voxels. The combined images 42 and 44 are then manipulated to yield composite image 46, that may have the HCM voxels blanked out (as actually shown, and corresponding to subtracting), blinking, or represented in another manipulated manner. Inasmuch as the subtracting allows a larger greyness range to be used for the remainder of the tissue-based configuration, thresholding for suppressing the dotted voxels of image 42 may be more accurate. Otherwise, the existing range of rendering greyness values can be assigned to a smaller range in absorption values for the radiation. The disclosure with respect to FIG. 2 has been centered on angiography. However, the method and apparatus are likewise applicable to the selective image manipulating of corrective or other implants in bone joints. In the latter case, the contrast run would often go without the transient introduction of contrast matter into the tissue-based configuration.

Figure 3:
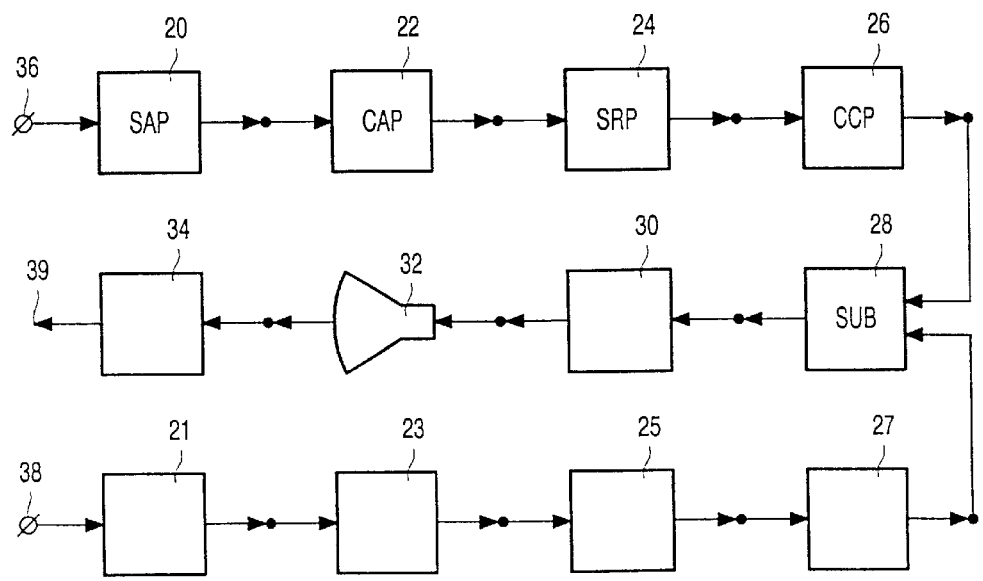

FIG. 3 is a block diagram of successive operations of the present invention. Input 36 receives the measurement data of the background scan or mask run. In block 20, processing of the various absorption data singly takes place, such as for correcting against unsteady amplification. In block 22, processing of the collection of absorption data for the whole run takes place, such as for correcting pincushion deformation and the like. Such processing is effected with the help of calibration data, that need be provided only at a repetition rate that is substantially lower than the taking of the various measurement runs. At present, a repetition of once every few months is usually sufficient. For Flat Dynamic X-ray Detector FDXD technology the pincushion feature is generally superfluous. In block 24, from the various absorption data, the overall spatial volume is reconstructed. In block 26, this volume configuration can be preprocessed for further correction. In similar manner, input 38 receives the absorption data of the operational scan or contrast run, which data are processed in a corresponding manner in the sequence of processing blocks 21, 23, 25, 27. In block 28, the two spatial volumes are subtracted or manipulated otherwise for allowing a 3D visualization based thereon. In block 30, the intended projection direction, projection origin, display size, and further rendering parameters such as color, blinking, and intensity may be changed in accordance to a user's preference or requirements. In block 32, the image is displayed on a suitable display element. In block 34, the image may be used for storage, for deriving decision signals, and other outputs that are presented on terminal 39 for further usage.

What is claimed is:

1. A method for rendering a three-dimensional (3D) image of a spatial and tissue-based configuration through multi-angular absorption measurements of X-ray-radiation when transversing said configuration for a mask run and a contrast run respectively, while in a manipulating operation causing at least partial discrimination relative certain high-absorptive items in said configuration, wherein said method includes the steps of:

separately running each of said mask run and said contrast run, and calculating separate 3D images, respectively, and executing said manipulating operation after said step of separately running.

2. The method as claimed in claim 1, wherein said step of executing said manipulating operation includes allowing both transient and steady state features of a 3D image display.

3. The method as claimed in claim 1, further including executing calibration runs at time intervals that are large in comparison with time intervals associated with executing said mask run and said contrast run, respectively.

4. The method as claimed in claim 1, wherein said step of executing said manipulating operation is effected in a 2D environment to allow segmenting among identifiable voxels in a 3D environment.

5. An apparatus constructed for executing the method as claimed in claim 2 for rendering a three-dimensional image of a spatial and tissue-based configuration, said apparatus comprising multi-angular absorption measurement facilities for X-rays when transversing said configuration for a mask run and a contrast run respectively, calculating means for calculating said three-dimensional image, and manipulating means for executing a manipulating operation causing a least partial discrimination relative certain high-absorptive items in said configuration, wherein said apparatus further includes that said manipulating means are fed by said calculating means for controlling in each of said mask run and said contrast run a calculation of said image, and that said manipulating means are fed by said calculating means for allowing said manipulating relative respective three-dimensional calculated images as stemming from respective said configurations.

* * * * *